(12) United States Patent
Anderson et al.

(10) Patent No.: US 10,697,309 B2
(45) Date of Patent: Jun. 30, 2020

(54) PLATFORM COVER PLATES FOR GAS TURBINE ENGINE COMPONENTS

(71) Applicant: United Technologies Corporation, Farmington, CT (US)

(72) Inventors: Corey D. Anderson, East Hartford, CT (US); Brandon W. Spangler, Vernon, CT (US)

(73) Assignee: RAYTHEON TECHNOLOGIES CORPORATION, Farmington, CT (US)

( * ) Notice: Subject to any disclaimer, the term of this patent is extended or adjusted under 35 U.S.C. 154(b) by 100 days.

(21) Appl. No.: 15/961,930

(22) Filed: Apr. 25, 2018

(65) Prior Publication Data
US 2019/0330986 A1    Oct. 31, 2019

(51) Int. Cl.
*F01D 5/18*    (2006.01)
(52) U.S. Cl.
CPC .......... *F01D 5/188* (2013.01); *F05D 2220/32* (2013.01); *F05D 2240/12* (2013.01); *F05D 2250/70* (2013.01); *F05D 2260/201* (2013.01)
(58) Field of Classification Search
CPC . F01D 5/188; F01D 9/06; F01D 9/065; F01D 11/24; F01D 25/12; F05D 2240/11; F05D 2240/12; F05D 2240/81; F05D 2260/201; F02C 7/12; F23R 2900/03044; Y02T 50/676

See application file for complete search history.

(56) References Cited

U.S. PATENT DOCUMENTS

| 5,207,556 | A | 5/1993 | Frederick et al. |
| 5,634,766 | A | 6/1997 | Cunha et al. |
| 7,008,185 | B2 | 3/2006 | Peterman et al. |
| 8,142,137 | B2 * | 3/2012 | Johnston ................. F01D 5/188 |
| | | | 415/115 |

(Continued)

FOREIGN PATENT DOCUMENTS

| CH | 700687 A1 | 9/2010 |
| DE | 2628807 A1 | 1/1977 |

(Continued)

OTHER PUBLICATIONS

European Search Report for European Application No. 19159160.1, International Filing Date Feb. 25, 2019, dated Jul. 3, 2019, 4 pages.

*Primary Examiner* — Igor Kershteyn
*Assistant Examiner* — Danielle M. Christensen
(74) *Attorney, Agent, or Firm* — Cantor Colburn LLP (57) ABSTRACT

Components for gas turbine engines are provided. The components include a platform, a first airfoil extending from the platform, a first cavity located within the first airfoil, the first cavity includes a forward portion and an aft portion separated by a divider, a cover plate attached to the platform on a side opposite the airfoil, wherein a platform cavity is defined between the cover plate and the platform and wherein the first cavity is fluidly connected to the platform cavity through a first cavity inlet, and a first cavity separating rail dividing the platform cavity into a first platform forward cavity and a first platform aft cavity, wherein the first platform forward cavity is fluidly connected to the aft portion of the first cavity and the first platform aft cavity is fluidly connected to the forward portion of the first cavity.

20 Claims, 7 Drawing Sheets

(56) References Cited

U.S. PATENT DOCUMENTS

| | | |
|---|---|---|
| 8,393,867 B2 | 3/2013 | Chon et al. |
| 8,662,844 B2 | 3/2014 | Hada et al. |
| 2012/0177479 A1* | 7/2012 | Azad ..................... F01D 5/187 |
| | | 415/115 |
| 2019/0170002 A1* | 6/2019 | Spangler ................ F01D 5/147 |

FOREIGN PATENT DOCUMENTS

| | | |
|---|---|---|
| EP | 0182588 B1 | 9/1988 |
| EP | 1808575 A2 | 7/2007 |

* cited by examiner

PLATFORM COVER PLATES FOR GAS TURBINE ENGINE COMPONENTS

STATEMENT REGARDING FEDERALLY SPONSORED RESEARCH OR DEVELOPMENT

This invention was made with government support under Contract No. W58RGZ-16-C-0046 awarded by the U.S. Army. The government has certain rights in the invention.

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate and compress the working fluid flow, or to generate lift for conversion to rotational energy in the turbine.

Airfoils may incorporate various cooling cavities located adjacent external side walls. Cooling air, depending on the airfoil configuration (e.g., blade, vane, etc.) may be supplied from an inner diameter and/or an outer diameter thereof. For example, typically blades are fed cooling air through a platform at an inner diameter thereof. Vanes, however, may be fed cooling air from one or both of the inner and outer diameters. In some arrangements, the platforms of the airfoils may be configured with platform cover plates with impingement holes. The cover plates may be arranged to direct cooling air onto the non-gaspath surfaces of the platform itself, to thus cool the platform.

The cool air may pass through the cover plate, impinge upon the platform, and then flow into one or more cooling cavities of the airfoil. Such cooling cavities are subject to both hot material walls (exterior or external) and cold material walls (interior or internal). Although such cavities are designed for cooling portions of airfoil bodies, various cooling flow characteristics can cause hot sections where cooling may not be sufficient. Accordingly, improved means for providing cooling within an airfoil may be desirable.

BRIEF DESCRIPTION

According to some embodiments, components for gas turbine engines are provided. The components include a platform, a first airfoil extending from the platform, a first cavity located within the first airfoil, the first cavity includes a forward portion and an aft portion separated by a divider, a cover plate attached to the platform on a side opposite the airfoil, wherein a platform cavity is defined between the cover plate and the platform and wherein the first cavity is fluidly connected to the platform cavity through a first cavity inlet, and a first cavity separating rail dividing the platform cavity into a first platform forward cavity and a first platform aft cavity, wherein the first platform forward cavity is fluidly connected to the aft portion of the first cavity and the first platform aft cavity is fluidly connected to the forward portion of the first cavity.

In addition to one or more of the features described above, or as an alternative, further embodiments of the components may include that the cover plate includes a first forward sub-plate and a first aft sub-plate, wherein the first forward sub-plate covers the first platform forward cavity and the first aft sub-plate covers the first platform aft cavity.

In addition to one or more of the features described above, or as an alternative, further embodiments of the components may include that the first forward sub-plate includes a first forward cavity impingement cooling aperture array and the first aft sub-plate includes a first aft cavity impingement cooling aperture array.

In addition to one or more of the features described above, or as an alternative, further embodiments of the components may include that the first forward cavity impingement cooling aperture array comprises a plurality of holes having a first flow area and the first aft cavity impingement cooling aperture array comprises a plurality of holes having a second flow area.

In addition to one or more of the features described above, or as an alternative, further embodiments of the components may include that the first flow area is less than the second flow area.

In addition to one or more of the features described above, or as an alternative, further embodiments of the components may include a baffle installed within the first airfoil, wherein the divider is part of the baffle and the baffle defines the forward portion and the aft portion within the baffle.

In addition to one or more of the features described above, or as an alternative, further embodiments of the components may include that the first cavity separating rail includes a rib portion that crosses the first cavity inlet at the divider.

In addition to one or more of the features described above, or as an alternative, further embodiments of the components may include that the platform comprises a forward rail, an aft rail, a first side rail, and a second side rail.

In addition to one or more of the features described above, or as an alternative, further embodiments of the components may include that the first cavity separating rail extends between the first side rail and the second side rail.

In addition to one or more of the features described above, or as an alternative, further embodiments of the components may include a second airfoil extending from the platform, wherein the second airfoil comprises a second cavity located within the second airfoil, the second cavity having a forward portion and an aft portion separated by a divider, wherein the cover plate covers an inlet of the second cavity.

In addition to one or more of the features described above, or as an alternative, further embodiments of the components may include that a second cavity separating rail divides the platform cavity into a second platform forward cavity and a second platform aft cavity, wherein the second platform forward cavity is fluidly connected to the aft portion of the second cavity and the second platform aft cavity is fluidly connected to the forward portion of the second cavity.

In addition to one or more of the features described above, or as an alternative, further embodiments of the components may include a third cavity separating rail extending between a forward rail and an aft rail of the platform, wherein the first cavity separating rail extends between a first side rail of the platform and the third cavity separating rail and the second cavity separating rail extends between a second side rail of the platform and the third cavity separating rail.

In addition to one or more of the features described above, or as an alternative, further embodiments of the components may include that the cover plate includes a first sub-plate and a second sub-plate formed as a unitary body.

In addition to one or more of the features described above, or as an alternative, further embodiments of the components may include that the cover plate includes a first sub-plate and a second sub-plate as separate sheets of material that are welded to the platform.

According to some embodiments, gas turbine engines are provided. The gas turbine engines include a combustor section and a turbine section downstream from the combustor section, the turbine section comprising at least one component. The component includes a platform, a first airfoil extending from the platform, wherein the first airfoil comprises a first cavity located within the first airfoil, the first cavity includes a forward portion and an aft portion separated by a divider, a cover plate attached to the platform on a side opposite the airfoil, wherein a platform cavity is defined between the cover plate and the platform and wherein the first cavity is fluidly connected to the platform cavity through a first cavity inlet, and a first cavity separating rail dividing the platform cavity into a first platform forward cavity and a first platform aft cavity, wherein the first platform forward cavity is fluidly connected to the aft portion of the first cavity and the first platform aft cavity is fluidly connected to the forward portion of the first cavity.

In addition to one or more of the features described above, or as an alternative, further embodiments of the gas turbine engines may include that the cover plate includes a first forward sub-plate and a first aft sub-plate, wherein the first forward sub-plate covers the first platform forward cavity and the first aft sub-plate covers the first platform aft cavity.

In addition to one or more of the features described above, or as an alternative, further embodiments of the gas turbine engines may include that the first forward sub-plate includes a first forward cavity impingement cooling aperture array and the first aft sub-plate includes a first aft cavity impingement cooling aperture array.

In addition to one or more of the features described above, or as an alternative, further embodiments of the gas turbine engines may include that the first forward cavity impingement cooling aperture array comprises a plurality of holes having a first flow area and the first aft cavity impingement cooling aperture array comprises a plurality of holes having a second flow area.

In addition to one or more of the features described above, or as an alternative, further embodiments of the gas turbine engines may include a baffle installed within the first airfoil, wherein the divider is part of the baffle and the baffle defines the forward portion and the aft portion within the baffle.

In addition to one or more of the features described above, or as an alternative, further embodiments of the gas turbine engines may include that the component further includes a second airfoil extending from the platform, wherein the second airfoil comprises a second cavity located within the second airfoil, the second cavity having a forward portion and an aft portion separated by a divider, wherein the cover plate covers an inlet of the second cavity.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
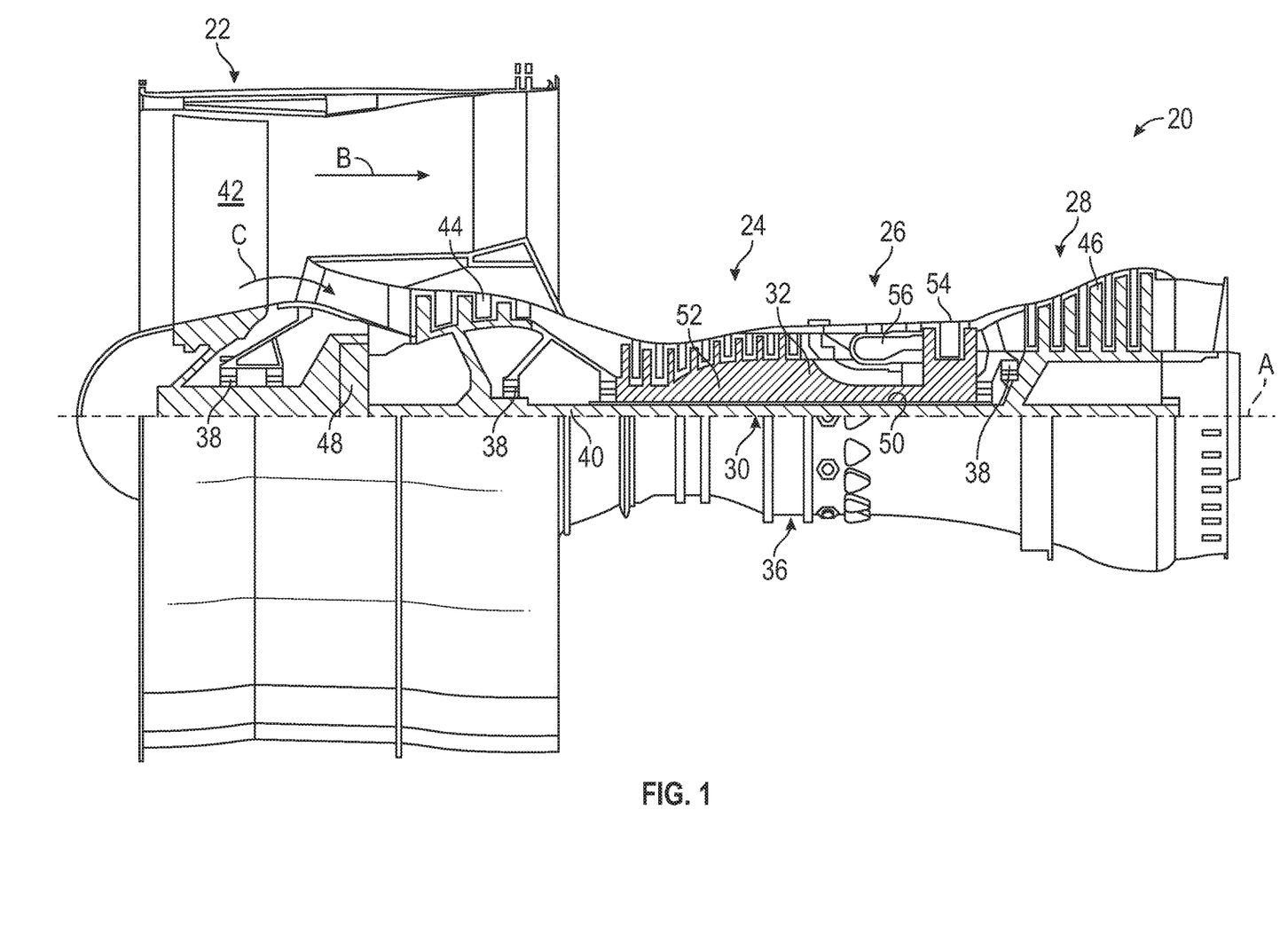
FIG. 1 is a schematic cross-sectional illustration of a gas turbine engine that may incorporate embodiments of the present disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a gear system 48 to drive the fan 42 at a lower speed than the low speed spool 30. The high speed spool 32 includes an outer shaft 50 that interconnects a high pressure compressor 52 and high pressure turbine 54. A combustor 56 is arranged in exemplary gas turbine 20 between the high pressure compressor 52 and the high pressure turbine 54. An engine static structure 36 is arranged generally between the high pressure turbine 54 and the low pressure turbine 46. The engine static structure 36 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one non-limiting example is a high-bypass geared aircraft engine. In a further non-limiting example, the engine 20 bypass ratio is greater than about six (6), with an example embodiment being greater than about ten (10), the gear system 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The gear system 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ ^{\circ}\ R)/(514.7^{\circ}\ R)]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the described configuration, as the teachings may be applied to other types of engines such as, but not limited to, turbojets and turboshafts, wherein an intermediate spool includes an intermediate pressure compressor ("IPC") between a low pressure compressor ("LPC") and a high pressure compressor ("HPC"), and an intermediate pressure turbine ("IPT") between the high pressure turbine ("HPT") and the low pressure turbine ("LPT").

Figure 2:
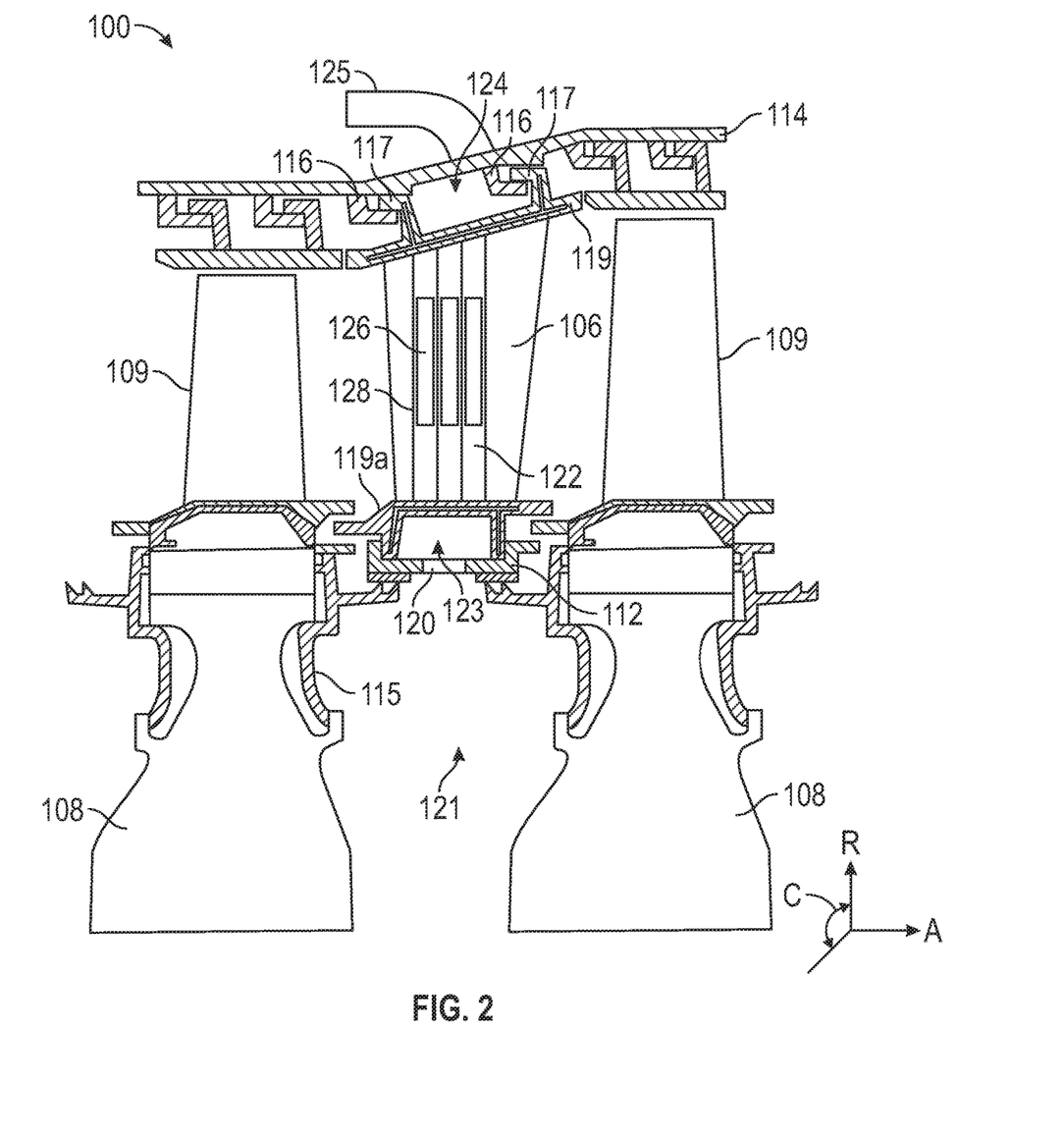
FIG. 2 is a schematic illustration of a portion of a turbine section of a gas turbine engine that may incorporate embodiments of the present disclosure.

Referring now to FIG. 2, a cooling design in a turbine section 100 for a gas turbine engine may utilize a vane 106 disposed between axially adjacent bladed full hoop disks 108 having respective blades 109. As shown, the vane 106 is disposed radially between an inner air seal 112 and a full hoop case 114 on an outer side. The inner air seal 112 may be a full hoop structure supported by opposing vanes, including a plurality of vanes 106 that are separated in a circumferential direction. The vane 106 is supported by the full hoop case 114 through segmented vane hooks 117. One or more full hoop cover plates 115 may minimize leakage between the vane 106 and the blades 109. The vane 106 is radially supported by the full hoop case 114 with segmented case hooks 116 in mechanical connection with the segmented vane hooks 117. The vane 106 may be circumferentially supported between circumferentially adjacent platforms 119 which may include feather seals that can minimize leakage between the adjacent vanes 106 into the gas path.

A turbine cooling air (TCA) conduit 125 provides cooling air into an outer diameter supply cavity 124 defined in part by an outer platform 119 and the full hoop case 114. The vane 106 is hollow so that air can travel radially into and longitudinally downstream from the outer diameter supply cavity 124, through the vane 106 via one or more airfoil cavities 122, and into a vane inner diameter cavity 123. The vane inner diameter cavity 123 is defined, in part, by an inner platform 119a. Thereafter air may travel through an orifice 120 in the inner air seal 112 and into a rotor cavity 121. Accordingly, cooling air for at least portions of the vane 106 will flow from a platform region, into the vane, and then out of the vane and into another platform region and/or into a hot gaspath/main gaspath. In some arrangements, the platforms 119 can include ejection holes to enable some or all of the air to be injected into the main gaspath.

It is to be appreciated that the longitudinal orientation of vane 106 is illustrated in a radial direction, but other orientations for vane 106 are within the scope of the disclosure. In such alternate vane orientations, fluid such as cooling air can flow into the vane cavity 122 through an upstream opening illustrated herein as outer diameter supply cavity 124 and out through a downstream opening in vane cavity 122 illustrated herein as inner diameter cavity 123. A longitudinal span of vane cavity 122 being between such openings.

The vane 106, as shown, includes one or more baffles 126 located within the vane 106. The baffles 126 are positioned within one or more respective baffle cavities 128. The baffle cavities 128 are sub-portions or sub-cavities of the vane cavity 122. In some embodiments, such as shown in FIG. 2, the baffle cavities 128 are internal cavities that are axially inward from the leading and trailing edges of the vane 106, although such arrangement is not to be limiting.

As shown and labeled in FIG. 2, a radial direction R is upward on the page (e.g., radial with respect to an engine axis) and an axial direction A is to the right on the page (e.g., along an engine axis). Thus, radial cooling flows will travel up or down on the page and axial flows will travel left-to-right (or vice versa). A circumferential direction C is a direction into and out of the page about the engine axis.

In a conventional vane design, often the cooling air to be utilized on a platform is ejected into the main gas path through film cooling holes directly on the exterior gaspath surface of the inner diameter and/or outer diameter vane platform(s). However, embodiments provided herein are directed to utilizing cooling air at or from the platform for cooling both the platform and the main body of the airfoil. Such cooling air will flow from the platform area/cavity into a radially extending airfoil cavity. In cooling design configurations where the same coolant flow is utilized to cool the inner diameter and/or the outer diameter platforms and the airfoil exterior hot walls, it may be necessary to provide convective cooling along platform surfaces that are immediately adjacent to both the airfoil pressure and suction side surfaces. In this scenario, platform cooling air flow may be "drawn" from various opposing and non-opposing directions in order to provide the necessary cooling airflow required to adequately cool the vane airfoil pressure side and suction side surfaces, as well as, the vane airfoil leading and trailing edge surfaces.

Figure 3A:
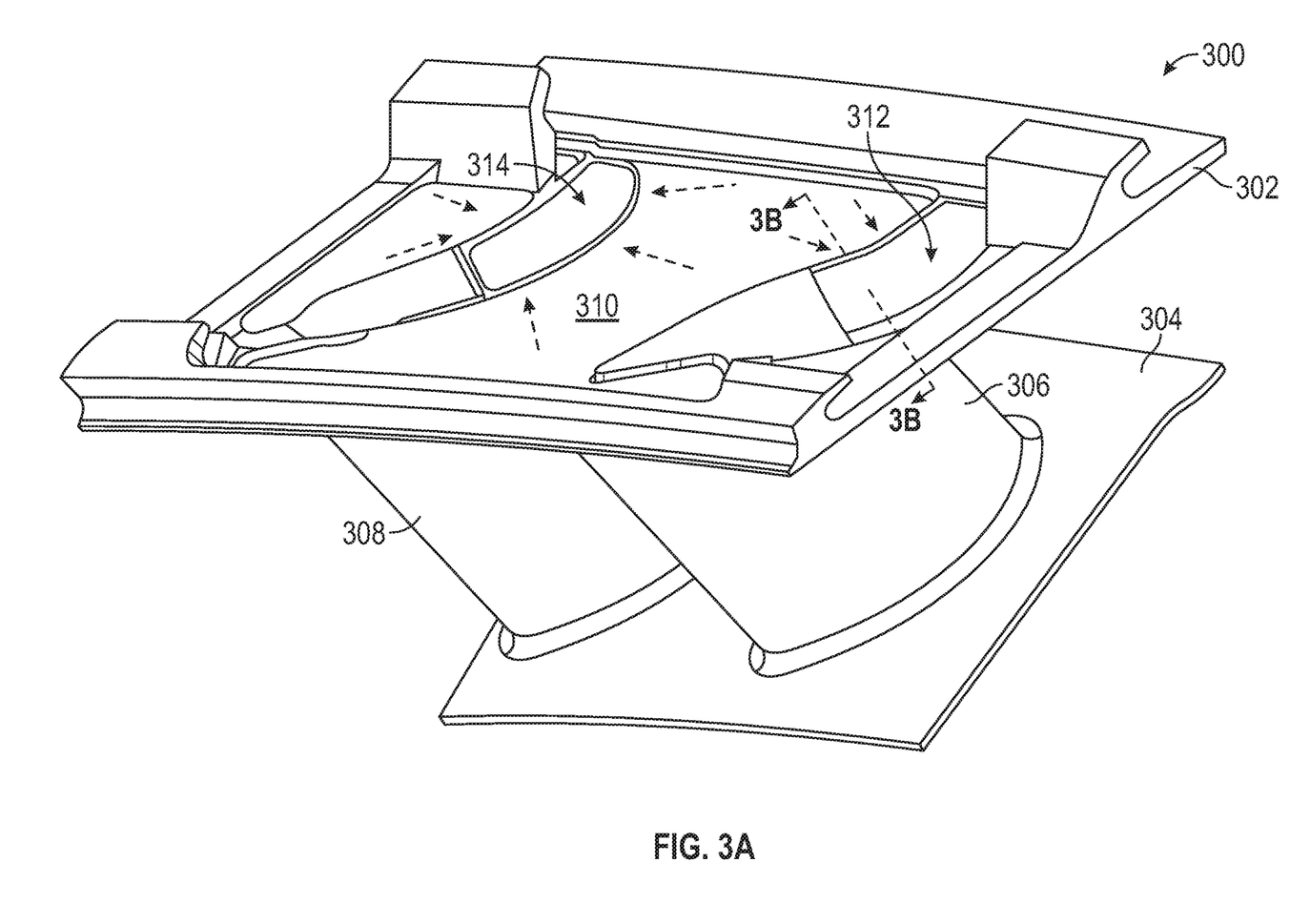
FIG. 3A is a schematic illustration of a component of a gas turbine engine that may incorporate embodiments of the present disclosure.
Figure 3B:
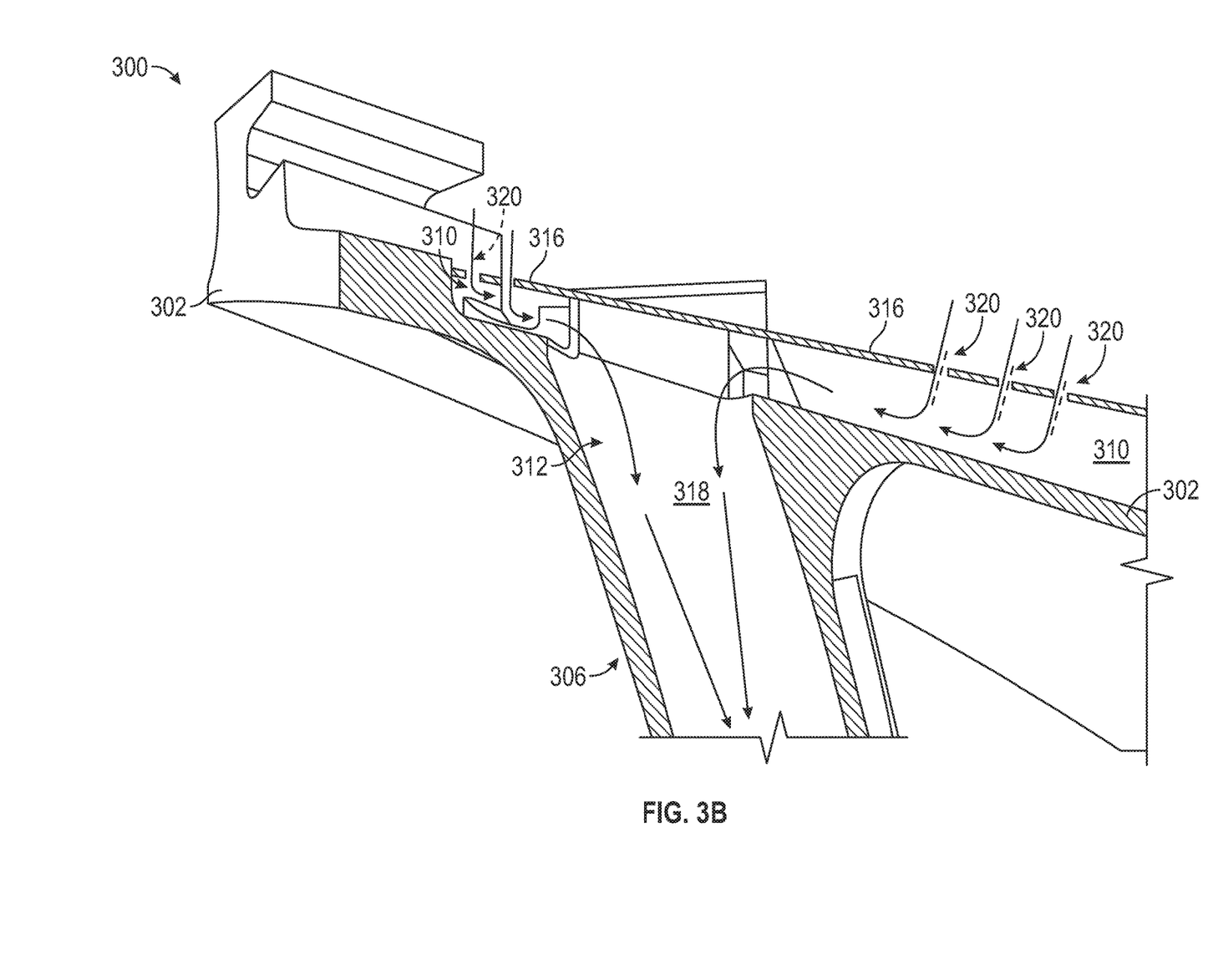
FIG. 3B is a side view of an airfoil and platform of the component of FIG. 3A having a cover plate installed to the platform, as viewed along the line 3B-3B.

Turning to FIGS. 3A-3B, a gas turbine engine component 300 is schematically shown, with FIG. 3A being an isometric view thereof and FIG. 3B being a side, cross-sectional view of the component 300 with a cover plate installed as viewed along the line 3B-3B. The gas turbine engine component 300 includes a first platform 302 and a second platform 304. Extending between the first and second platforms 302, 304 are a first airfoil 306 and a second airfoil 308. The gas turbine engine component 300, as shown, forms a portion of a vane section that can be installed in a turbine section of a gas turbine engine (e.g., as shown and describe above).

As shown in FIG. 3A, the airfoils 306, 308 include a plurality of airfoil cavities, which are open to and in fluid communication with a platform space or platform cavity 310. In FIG. 3A, the platform cavity 310 is formed between the illustrated surface of the first platform 302 and a cover plate (as shown in FIG. 3B). Those of skill in the art will appreciate that use of cover plates on platforms to form the platform cavities, and the cover plate is not shown for clarity and simplicity of illustration. Accordingly, as will be appreciated by those of skill in the art, a platform cavity is a cavity or volume that is formed between a surface of a platform on a side opposite a main, hot gaspath of the platform (i.e., a backside surface of the platform) and a cover plate that is installed to the platform. The platform cavity in operation will act as a cooling air channel that is formed between the cover plate and the backside of the platform surface which creates a conduit for cooling air to be transferred across the cold side of platform surfaces to provide convective cooling. The cover plate may include one or more inlet apertures, such as impingement holes, that are arranged to provide impingement cooling to the cold side surface of the platform and flow through the platform cavity.

The cooling air within the platform cavity is fed into inlets of a vane airfoil to provide cooling within the vanes, as appreciated by those of skill in the art. Such inlets can be provided at both inner and outer diameter platforms of the airfoil (e.g., first and second platforms 302, 304) and thus cooling air can be provided from one or more opposing platform cavities. Those of skill in the art will appreciate that the cover plates can include a single inlet feed for cooling air or may include multiple impingement holes (e.g., an array).

As shown in FIG. 3A, the first airfoil 306 includes respective airfoil cavity inlet 312 and the second airfoil 308 includes respective airfoil cavity inlet 314. The airfoil cavity inlets 312, 314 are inlets to internal airfoil cavities that, in some arrangements, extend from the first platform 302, through the respective airfoil 306, 308, and to the second platform 304, thus providing a cooling flow path through the respective airfoil 306, 308. In some arrangements, the airfoils 306, 308 are integrally formed with the platforms 302, 304 and in other arrangements, the airfoils 306, 308 can be separately formed and subsequently attached to the platforms 302, 304. Air within the platform cavity 310 (between the first platform 302 and a cover plate) can be fed into the airfoil cavity inlets 312, 314. In typical airfoil/platform arrangements, the cooling air within the platform cavity 310 will enter the airfoil cavity inlets 312, 314 from any/all directions, which may cause cooling flow efficiency issues (e.g., due to turbulent interactions). In some airfoil/platform arrangements, multiple platform sub-cavities can be formed between adjacent airfoils (e.g., between first and second airfoil 306, 308) along the backside of the first platform 302. In some such arrangements, the cooling air from two platform sub-cavities will flow toward each other at the airfoil cavity inlets 312, 314. A schematic illustration of airflow from the platform cavity 310 flowing toward the airfoil cavity inlets 312, 314 in opposing directions is shown by the dashed arrows of FIG. 3A.

Turning now to FIG. 3B, a side view illustration of the gas turbine engine component 300 having a cover plate 316 installed to the first platform 302 is shown. The cover plate 316, when installed to the first platform 302, defines the platform cavity 310 between the structure of the first platform 302 and the cover plate 316, as shown. FIG. 3B also illustrates the flow direction of cooling air flowing through the cover plate 316 and into an airfoil cavity 318 of the first airfoil 306. As shown, the first airfoil 306 is integrally formed with the platform 302. The airfoil cavity 318 is fluidly connected to the platform cavity 310 through the airfoil cavity inlet 312 of the first airfoil 306.

The cover plate 316, as shown, includes a plurality of cooling holes 320 (e.g., holes, apertures, slots, impingement holes, etc.) that enable a cooling flow to enter the platform cavity 310. A cooling flow enters the platform cavity 310 through the cooling holes 320 and travels along a surface of the platform 302 and into the airfoil cavity 318. Although shown in FIG. 3B with the use of an arrangement of multiple cooling holes 320 formed in the cover plate 316, those of skill in the art will appreciate that other arrangements (e.g., single feed port) can be used without departing from the scope of the present disclosure.

As shown in FIG. 3B, airfoil into the airfoil cavity 318 is sourced from two opposing sides at the airfoil cavity inlet 312. As will be appreciated when viewing FIG. 3A, such cooling air may be sourced from any direction, mix, and enter the respective airfoil cavity inlets 312, 314. In some embodiments, the use of baffles may provide for improved or optimized cooling schemes (e.g., as shown in FIG. 2). However, in some embodiments a single baffle may be employed for an entire span of an airfoil (or span a large section of the airfoil), such as from leading edge to trailing edge. However, such baffles typically cannot be optimized for the different cooling requirements of the airfoil, such as at the outer diameter, along the pressure and suction sides, and/or at the leading edge. Certain portions of the airfoil may require increased cooling due to higher heat loads applied thereto (e.g., at the leading edge, outer diameter portion). To account for this, divided baffles may be employed, wherein the baffle defines multiple internal cavities to direct some air to the leading edge and some air to aft portions of the airfoil. Although such arrangement may improve cooling, further improvements may be beneficial.

In a divided baffle arrangement, a portion of the cooling flow may be directed to cool the airfoil surfaces and another portion of the cooling flow may be directed as through flow that flows from one end (e.g., outer diameter) to the other end (e.g., the inner diameter) of the airfoil. In other embodiments, a similar arrangement may be cast into the airfoil structure, with two separate, but adjacent cast-in cavities.

As noted, in traditional vane design, platform cooling can be provided by impingement cooling. In a baffled vane design, the cooling air is impinged on the platform and then moved into the baffle where it provides cooling air for the airfoil as well as a through flow. However, the specific demands of the through flow and a cooling flow (e.g., cooling flow used for specific parts of an airfoil, such as the leading edge) may be different. For example, because the through flow air is not used to cool the airfoil, it may have additional heatup margin in the platform, whereas the air used to cool the airfoil may have limited heatup capability in the platform. A traditional impingement design does not allow the two flow heat-ups to be optimized.

Accordingly, embodiments provided herein are directed to platform cover plate configurations that enable improved cooling schemes through and/or for an airfoil. For example, in some embodiments, two distinct and fluidly separate platform cavities (or sub-cavities) are formed by the platform and a cover plate. The cover plate includes a first sub-plate and a second sub-plate wherein each sub-plate has a unique impingement hole configuration. The two sub-cavities each feed distinct airfoil cavities (e.g., a dual-segmented baffle containing one baffle segment for thru-flow and the other for airfoil cooling flow). In accordance with embodiments described herein, because the two flows are isolated from one another, the platform cooling can be optimized. In one non-limiting embodiment, the forward platform cavity provides more cooling, and this air is shifted aft to the thru-flow cavity.

In accordance with embodiments of the present disclosure, the platform is arranged to segregate the platform (impingement) cooling air into two distinct platform cavities. The two platform cavities feed two distinct airfoil cavities (e.g., main body, baffle, etc.). The cooling air within the airfoil cavities will dump to two distinct parts of the engine (e.g., through-flow and airfoil cooling flow, through-flow to two different locations, both flows dumping to a gaspath to feed different cooling schemes, etc.). Because the two cooling circuits are segregated, the impingement cooling at the platform can be optimized. For example, a forward-platform impingement cooling (e.g., a first platform sub-cavity) may take on more heat and this air can be shifted to the aft-baffle cavity to provide through-flow. In contrast, within a second platform sub-cavity (e.g., aft of the first platform sub-cavity) the impingement flow takes less heat-up and pressure loss. This impingement air may be shifted forward and directed into a leading edge baffle cavity, and thus feed into an airfoil cooling cavity. Because the airfoil cooling flow air is cooler and higher pressure than in prior configurations, the airfoil can be better cooled and part life improved.

Figure 4:
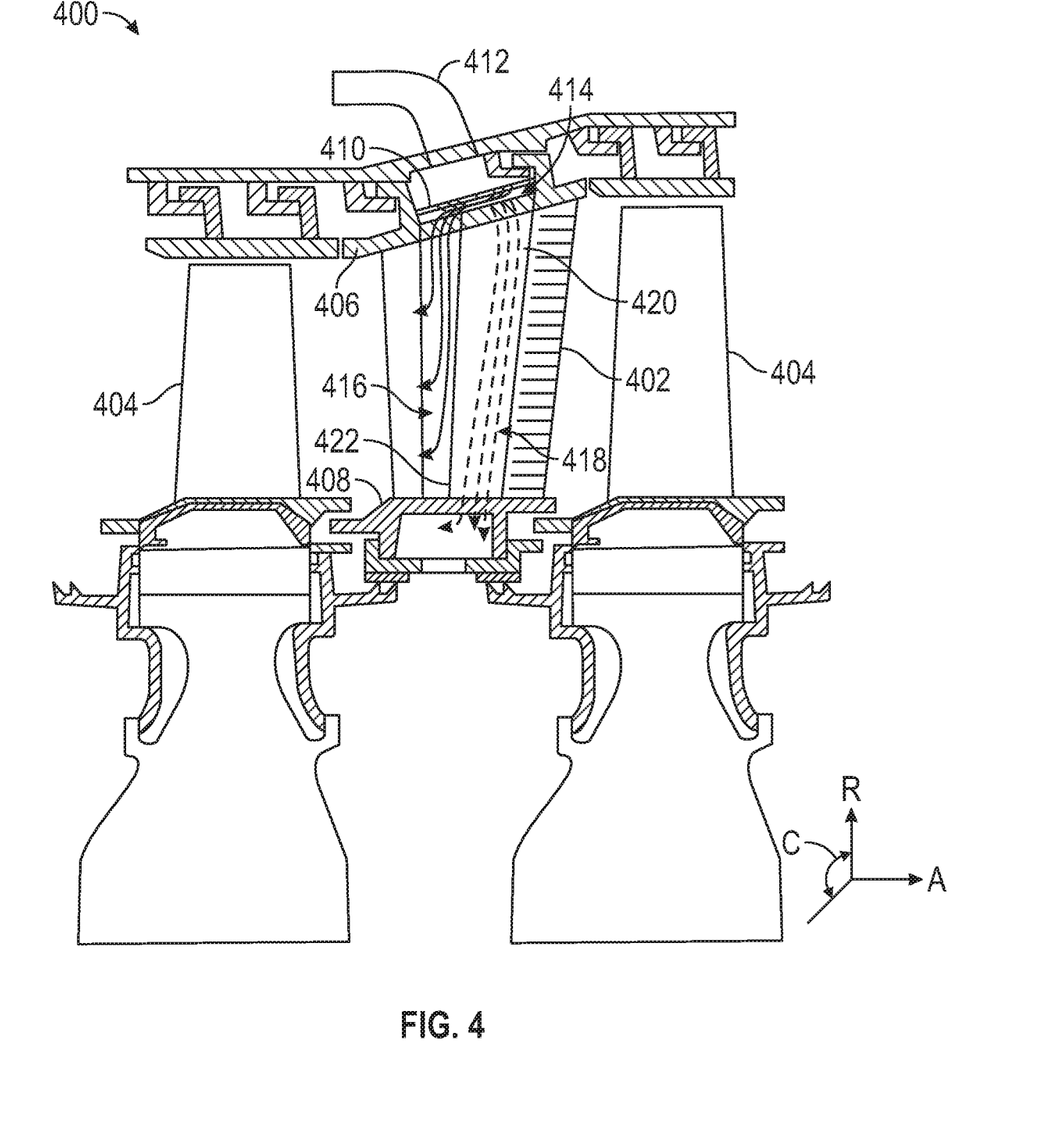
FIG. 4 is a schematic illustration of a portion of a turbine section of a gas turbine engine in accordance with an embodiment of the present disclosure.

Referring now to FIG. 4, a turbine section 400 having at least one vane 402 disposed between blades 404, in an axial direction A, is schematically shown. The turbine section 400 may be similar to that shown and described with respect to FIG. 2, and thus a detailed explanation will not be repeated. As shown, the vane 402 is disposed between a first platform 406 and a second platform 408, in a radial direction R. In this illustration the first platform 406 is an outer diameter platform and the second platform 408 is an inner diameter platform.

A platform cover plate 410 is installed on a cold side of the first platform 406. Although shown with a single vane 402, those of skill in the art will appreciate that a plurality of vanes may be provided, with adjacent vanes arranged in a circumferential direction C. A turbine cooling air (TCA) conduit 412 provides cooling air into an outer diameter supply cavity. The cooling air will flow through the platform cover plate 410 and enter a platform cavity 414 that is defined between the first platform 406 and the platform cover plate 410. The cover plate 410 may include one or more impingement holes to allow the flow of cooling air therethrough. The cooling air will then flow into one or more airfoil cavities. For example, as shown, a first airfoil cavity 416 is arranged along the leading edge of the vane 402 (e.g., a forward airfoil cavity) and a second airfoil cavity 418 is located aft of the first airfoil cavity 416. The first and second airfoil cavities 416, 418 are separated by a divider 422. The first airfoil cavity 416 may be an airfoil body cooling cavity, wherein the cooling air therein is expelled through film cooling holes of the vane 402. The second airfoil cavity 418 may be a through-flow cavity that directs cool air toward an inner radius of the turbine section 400.

In another embodiment, a divided baffle is installed within the airfoil cavity. The divided baffle is a hollow body and includes a divider to separate the hollow body of the divided baffle into first and second baffle cavities. A first baffle cavity may feed an airfoil body cooling cavity, wherein the cooling air therein is expelled through film cooling holes of the vane. A second baffle cavity may be a through-flow cavity that directs cool air toward an inner radius of the turbine section.

The first platform 406 and the cover plate 410 are arranged to provide optimized impingement cooling to the first platform 406 and further may enable optimized cooling within the airfoil cavities 416, 418.

Figure 5A:
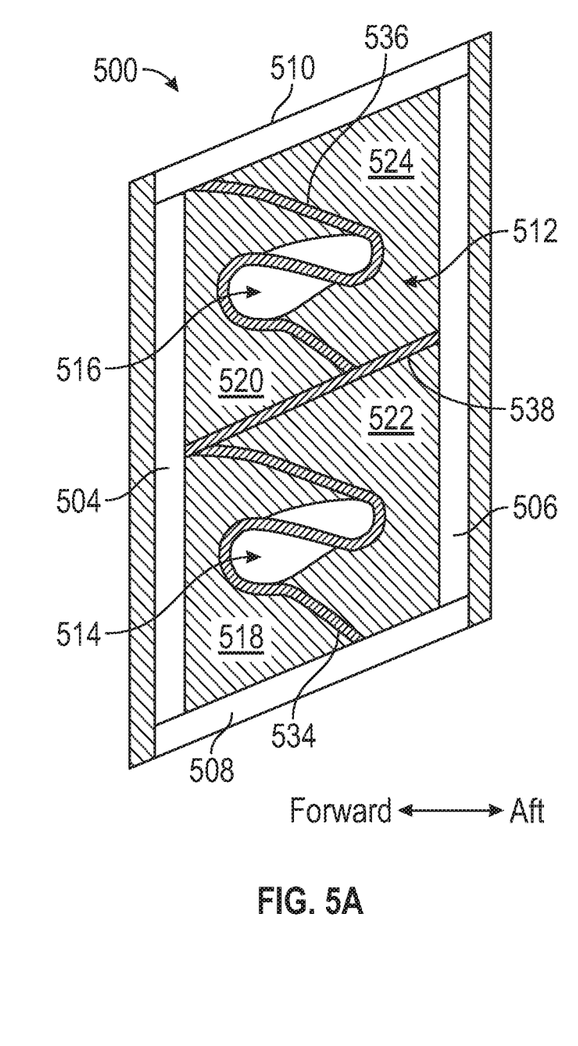
FIG. 5A is a schematic illustration of a platform in accordance with an embodiment of the present disclosure.
Figure 5B:
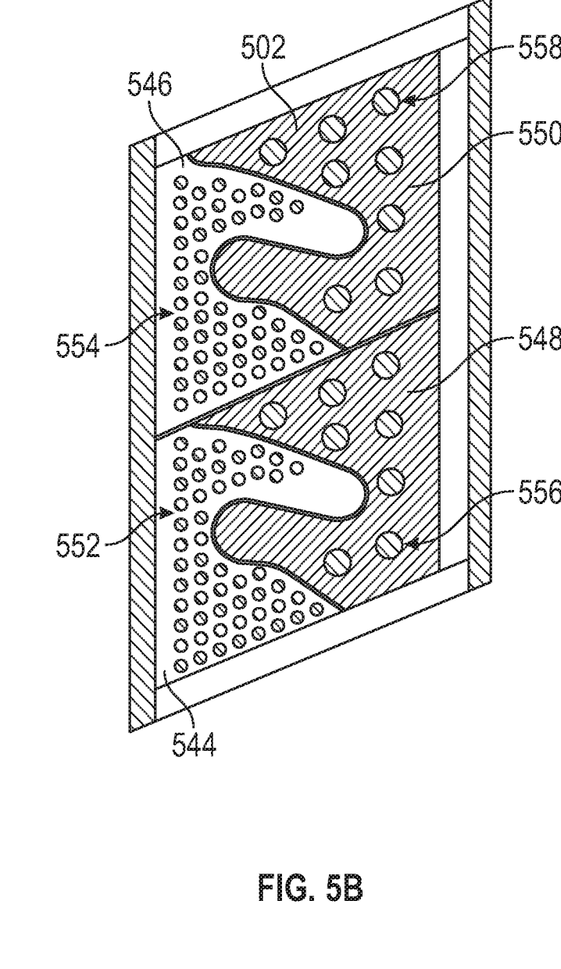
FIG. 5B is a schematic illustration of the platform of FIG. 5A with a cover plate of the present disclosure installed thereto.
Figure 5C:
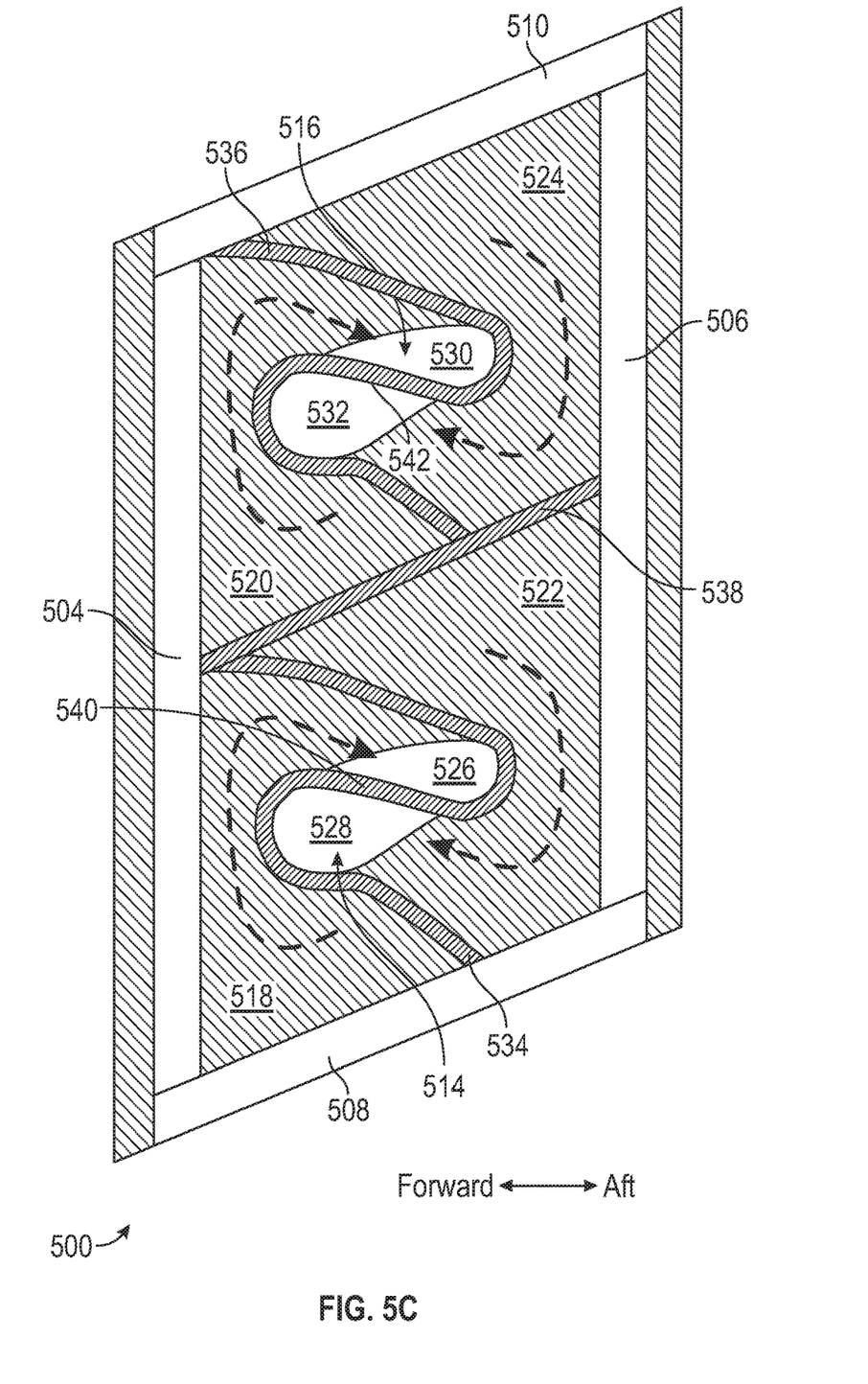
FIG. 5C is a schematic illustration of airflow through a platform cavity of the platform of FIG. 5A.

Turning now to FIGS. 5A-5C, schematic illustrations of a platform arrangement in accordance with an embodiment of the present disclosure are shown. FIG. 5A is a plan view of a platform 500 with a cover plate not installed thereto, FIG. 5B is a plan view of the platform 500 with a cover plate 502 installed thereto (and defining a platform cavity therebetween), and FIG. 5C is a plan view illustrating airfoil within the airfoil cavity in accordance with an embodiment of the present disclosure.

The platform 500, in this embodiment, will be discussed as an outer diameter platform, with airflow flowing radially inward through the platform into one or more airfoil cavities. However, those of skill in the art will appreciate that platform arrangements described herein can be employed at inner diameter locations.

The platform 500 has a forward rail 504, an aft rail 506, a first side rail 508, and a second side rail 510. When the cover plate 502 is installed to the platform 500, a platform cavity 512 is defined by the platform 500, the cover plate 502, the forward rail 504, the aft rail 506, the first side rail 508, and the second side rail 510. The platform cavity 512 is arranged to supply cooling air into one or more airfoil cavities. In this illustrative embodiments, the platform 500 is connected to two airfoils, with a first airfoil cavity 514 and a second airfoil cavity 516. This embodiment is similar to that shown in FIG. 3A. Although a dual-airfoil arrangement is shown, those of skill in the art will appreciate that platforms and platform arrangements described herein can be applied to any number of airfoil arrangements, i.e., one or more. The airfoils of the present disclosure may include a divider rib, which may be provided by a baffle insert or may be a structural part of the airfoil. The divider rib separates the airfoil cavities 514, 516 into forward and aft airfoil sub-cavities (e.g., as shown in FIG. 4).

In accordance with embodiments of the present disclosure, the platform cavity 512 is divided into multiple sub-cavities 518, 520, 522, 524 to supply air into the airfoil cavities 514, 516. For example, as shown, a first platform forward cavity 518, a second platform forward cavity 520, a first platform aft cavity 522, and a second platform aft cavity 524. The shape of the platform sub-cavities 518, 520, 522, 524 are set to achieve a specific cooling flow path, as described herein. For example, as shown in FIG. 5C, air from the first platform forward cavity 518 may flow into an aft portion 526 of the first airfoil cavity 514 and air from the first platform aft cavity 522 may flow into a forward portion 528 of the first airfoil cavity 514. Similarly, air from the second platform forward cavity 520 may flow into an aft portion 530 of the second airfoil cavity 516 and air from the second platform aft cavity 524 may flow into a forward portion 532 of the second airfoil cavity 516.

To achieve such flow, in this embodiment, the platform 500 includes a first cavity separating rail 534 and a second cavity separating rail 536. The first cavity separating rail 534 separates the first platform forward cavity 518 from the first platform aft cavity 522. The second cavity separating rail 536 separates the second platform forward cavity 520 from the second platform aft cavity 524. In this embodiment, a third cavity separating rail 538 is arranged to separate the adjacent first and second platform forward cavities 518, 520 and the adjacent first and second platform aft cavities 522, 524. It will be appreciated that the third separating rail 538 may be omitted in embodiments having a platform feeding a single airfoil cavity, or additional third cavity separating rails may be provided for additional airfoil cavities in a platform arrangement.

As shown in FIG. 5C, the first cavity separating rail 534 extends between the first sidewall 508 and the third cavity separating rail 538 and crosses over the first airfoil cavity 514. The second cavity separating rail 536 extends between the second side wall 510 and the third cavity separating rail 538 and crosses over the second airfoil cavity 516. The third cavity separating rail 538 extends between the forward rail 504 and the aft rail 506. The first cavity separating rail 534 includes a rib portion 540 that is configured to align with a rib or divider within the first airfoil cavity 514 (e.g., dividing baffle rib, airfoil separation rib, etc.). The second cavity separating rail 536 includes a rib portion 542 that is configured to align with a rib or divider within the second airfoil cavity 516. The rib portions 540, 542 are arranged to ensure that air from the respective platform sub-cavities enters the correct airfoil sub-cavities and mixing of such air is minimized or eliminated.

In some non-limiting embodiments, the arrangement of the cavity separating rails 534, 536, 538 are arranged such that relatively hot air from the platform forward cavities 518, 520 are moved aftward and enter the aft portions 526, 530 of the airfoil cavities 514, 516 where high levels of cooling may not be required. Similarly, in some such embodiments, relatively cool air from the platform aft cavities 522, 524 are moved forward and enter the forward portions 528, 532 of the airfoil cavities 514, 516 where the cooler air can be more effectively used at the forward portions of the airfoils. The air in the platform forward cavities 518, 520 is heated due to being upstream relative to the platform aft cavities 522, 524 (e.g., closer to hot gas expelled from a combustor).

In addition to having the platform cavity divided as described above, the cover plate 502 may also be optimized for cooling schemes. For example, as shown in FIG. 5B, the cover plate 502 includes a first forward sub-plate 544, a second forward sub-plate 546, a first aft sub-plate 548, and a second aft sub-plate 550. The four sub-plates 544, 546, 548, 550 may be separately formed, or may be sub-parts of a single cover plate that is installed to the platform 500. The shapes of the sub-plates 544, 546, 548, 550 are set to match or mirror the shapes of the sub-cavities 518, 520, 522, 524.

As shown, the first forward sub-plate 544 includes a first forward cavity impingement cooling aperture array 552. The second forward sub-plate 546 includes a second forward cavity impingement cooling aperture array 554. The first aft sub-plate 548 includes a first aft cavity impingement cooling aperture array 556. The second aft sub-plate 550 includes a second aft cavity impingement cooling aperture array 558. The forward cavity impingement cooling aperture arrays 552, 554 are arranged, as shown, with a relatively large number of small diameter or flow area impingement holes. In contrast, the aft cavity impingement cooling aperture arrays 556, 558 are arranged, as shown, with relatively small number of large diameter or flow area impingement holes. That is, the forward cavity impingement cooling aperture arrays 552, 554 may have apertures having a first diameter and the aft cavity impingement cooling aperture arrays 556, 558 may have apertures having a second diameter. In some embodiments, such as shown in FIG. 5B, the first diameter may be less than the second diameter. However, in other embodiments, the first diameter may be greater than the second diameter, or in other embodiments, the first and second diameters may be the same. Further, although shown as holes, the apertures may take the form of slots or other geometries, as will be appreciated by those of skill in the art. Further, the number, location, geometry, and/or orientation of the holes may vary, without departing from the scope of the present disclosure.

In this example, the small diameter holes of the forward sub-plates can provide for increased impingement cooling, as will be appreciated by those of skill in the art. The increased impingement can enable improved cooling at the forward side of the platform 500. A lower velocity flow may pass through the larger diameter impingement holes of the aft sub-plates, and less heat pickup may be achieved thereby. Thus, when the relatively cool air is moved forward, the cool air can effectively cool the forward portions 528, 532 of the airfoil cavities 514, 516.

Although described above with respect to hole diameter, variations in flow may be achieved though hole flow areas, individually or collectively. That is, the total flow area of one sub-plate may be different from the total flow area of the other sub-plate. Those of skill in the art will appreciate various arrangements to achieve different flow area configurations, and thus the same will not be described in detail. In some embodiments, one or both of the sub-plates may be formed with different diameter or flow area holes or apertures formed thereon. The impingement cooling through the plates/sub-plates may have any configuration and/or arrangement to achieve a desired cooling of the platform and/or cooling flow into and through the airfoil or baffle cavity.

As noted above, in some embodiments, the sub-plates 544, 546, 548, 550 may be parts of an integral sheet that forms the cover plate 502. In such embodiments, the cover plate 502 may be welded to the rails 504, 506, 508, 510, 534, 536, 538 to provide a seal to fluidly separate the different sub-cavities 518, 520, 522, 524 of the platform 500. In embodiments where the sub-plates 544, 546, 548, 550 are separate sheets of material, each sheet may be welded separately to the appropriate rails 504, 506, 508, 510, 534, 536, 538. Various types of welding may be employed without departing from the scope of the present disclosure, including, but not limited to laser welding and bead welding. Further, other types of joining may be employed without departing from the scope of the present disclosure.

Although shown herein with two airfoils, as noted above, any number of airfoils can be arranged with respect to a platform. For example, the platform cavity arrangement of the present disclosure can be employed for singlets, doublets, triplets, quads, etc. and thus the present disclosure is not to be limited by the above described embodiments and illustrations. Moreover, although described with respect to an outer diameter platform, the present platform arrangements may be employed at an inner diameter platform.

In one non-limiting example of the above described invention, the platform (impingement) cooling air is segregated into two (or more) distinct cavities. The separate platform cavities feed two (or more) distinct cavities of a baffle (or airfoil), and the air dumps to two distinct parts of the engine (e.g., through-flow and airfoil cooling flow, through-flow to two different locations, both flows dumping to a gaspath to feed different cooling schemes, etc.). Because the two circuits are segregated, the impingement cooling at the platform can be optimized. In this example, the forward-platform impingement cooling takes on more heat and this air is shifted to the aft-baffle cavity to provide through-flow. In contrast, the platform aft-cavity impingement flow takes less heat-up and pressure loss, and is shifted to the leading edge baffle cavity (i.e., the airfoil cooling cavity). Because the airfoil cooling flow air is cooler and higher pressure than in prior cooling schemes, the airfoil can be better cooled and part life improved.

Advantageously, embodiments provided herein are directed to platform cooling cavities and platform impingement cooling schemes. Embodiments provided herein allow for the optimization of heat-pickup resulting from platform cooling between through-flow air and airfoil cooling air. The cooling air for each flow-stream can be tailored to induce more, or less, cooling as depending on the needs of the airfoil, as well as the needs of upstream parts cooled by the through-flow air. This results in improved part life/reduced need for airfoil cooling.

As used herein, the term "about" is intended to include the degree of error associated with measurement of the particular quantity based upon the equipment available at the time of filing the application. For example, "about" may include a range of ±8%, or 5%, or 2% of a given value or other percentage change as will be appreciated by those of skill in the art for the particular measurement and/or dimensions referred to herein.

The terminology used herein is for the purpose of describing particular embodiments only and is not intended to be limiting of the present disclosure. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as "forward," "aft," "upper," "lower," "above," "below," "radial," "axial," "circumferential," and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A component for a gas turbine engine, the component comprising:
    a platform;
    a first airfoil extending from the platform;
    a first cavity located within the first airfoil, the first cavity includes a forward portion and an aft portion separated by a divider;
    a cover plate attached to the platform on a side opposite the airfoil, wherein a platform cavity is defined between the cover plate and the platform and wherein the first cavity is fluidly connected to the platform cavity through a first cavity inlet; and
    a first cavity separating rail dividing the platform cavity into a first platform forward cavity and a first platform aft cavity, wherein the first platform forward cavity is fluidly connected to the aft portion of the first cavity and the first platform aft cavity is fluidly connected to the forward portion of the first cavity.

2. The component of claim 1, wherein the cover plate includes a first forward sub-plate and a first aft sub-plate, wherein the first forward sub-plate covers the first platform forward cavity and the first aft sub-plate covers the first platform aft cavity.

3. The component of claim 2, wherein the first forward sub-plate includes a first forward cavity impingement cooling aperture array and the first aft sub-plate includes a first aft cavity impingement cooling aperture array.

4. The component of claim 3, wherein the first forward cavity impingement cooling aperture array comprises a plurality of holes having a first flow area and the first aft cavity impingement cooling aperture array comprises a plurality of holes having a second flow area.

5. The component of claim 4, wherein the first flow area is less than the second flow area.

6. The component of claim 1, further comprising a baffle installed within the first airfoil, wherein the divider is part of the baffle and the baffle defines the forward portion and the aft portion within the baffle.

7. The component of claim 1, wherein the first cavity separating rail includes a rib portion that crosses the first cavity inlet at the divider.

8. The component of claim 1, wherein the platform comprises a forward rail, an aft rail, a first side rail, and a second side rail.

9. The component of claim 8, wherein the first cavity separating rail extends between the first side rail and the second side rail.

10. The component of claim 1, further comprising:
    a second airfoil extending from the platform, wherein the second airfoil comprises a second cavity located within the second airfoil, the second cavity having a forward portion and an aft portion separated by a divider,
wherein the cover plate covers an inlet of the second cavity.

11. The component of claim 10, wherein a second cavity separating rail divides the platform cavity into a second platform forward cavity and a second platform aft cavity, wherein the second platform forward cavity is fluidly connected to the aft portion of the second cavity and the second platform aft cavity is fluidly connected to the forward portion of the second cavity.

12. The component of claim 11, further comprising a third cavity separating rail extending between a forward rail and an aft rail of the platform, wherein the first cavity separating rail extends between a first side rail of the platform and the third cavity separating rail and the second cavity separating rail extends between a second side rail of the platform and the third cavity separating rail.

13. The component of claim 10, wherein the cover plate includes a first sub-plate and a second sub-plate formed as a unitary body.

14. The component of claim 10, wherein the cover plate includes a first sub-plate and a second sub-plate as separate sheets of material that are welded to the platform.

15. A gas turbine engine comprising:
a combustor section; and
a turbine section downstream from the combustor section, the turbine section comprising at least one component, wherein the component comprises:
a platform;
a first airfoil extending from the platform, wherein the first airfoil comprises a first cavity located within the first airfoil, the first cavity includes a forward portion and an aft portion separated by a divider;
a cover plate attached to the platform on a side opposite the airfoil, wherein a platform cavity is defined between the cover plate and the platform and wherein the first cavity is fluidly connected to the platform cavity through a first cavity inlet; and
a first cavity separating rail dividing the platform cavity into a first platform forward cavity and a first platform aft cavity, wherein the first platform forward cavity is fluidly connected to the aft portion of the first cavity and the first platform aft cavity is fluidly connected to the forward portion of the first cavity.

16. The gas turbine engine of claim 15, wherein the cover plate includes a first forward sub-plate and a first aft sub-plate, wherein the first forward sub-plate covers the first platform forward cavity and the first aft sub-plate covers the first platform aft cavity.

17. The gas turbine engine of claim 16, wherein the first forward sub-plate includes a first forward cavity impingement cooling aperture array and the first aft sub-plate includes a first aft cavity impingement cooling aperture array.

18. The gas turbine engine of claim 17, wherein the first forward cavity impingement cooling aperture array comprises a plurality of holes having a first flow area and the first aft cavity impingement cooling aperture array comprises a plurality of holes having a second flow area.

19. The gas turbine engine of claim 15, further comprising a baffle installed within the first airfoil, wherein the divider is part of the baffle and the baffle defines the forward portion and the aft portion within the baffle.

20. The gas turbine engine of claim 15, wherein the component further comprises:
a second airfoil extending from the platform, wherein the second airfoil comprises a second cavity located within the second airfoil, the second cavity having a forward portion and an aft portion separated by a divider,
wherein the cover plate covers an inlet of the second cavity.

* * * * *